United States Patent
Fang (10) Patent No.: US 9,071,333 B2
(45) Date of Patent: Jun. 30, 2015

(54) DEVICE FOR CANCELING CROSSTALK, SIGNAL PROCESSING SYSTEM AND METHOD FOR CANCELING CROSSTALK

(75) Inventor: Liming Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1608 days.

(21) Appl. No.: 12/481,307

(22) Filed: Jun. 9, 2009

(65) Prior Publication Data

US 2009/0245503 A1    Oct. 1, 2009

Related U.S. Application Data

(63) Continuation of application No. PCT/CN2007/071239, filed on Dec. 14, 2007.

(30) Foreign Application Priority Data

Dec. 15, 2006  (CN) .......................... 2006 1 0168031

(51) Int. Cl.
  *H04B 3/23*  (2006.01)
  *H04B 3/32*  (2006.01)
  *H04B 3/487*  (2015.01)

(52) U.S. Cl.
  CPC . *H04B 3/32* (2013.01); *H04B 3/487* (2015.01)

(58) Field of Classification Search
  CPC .................................. H04B 3/32; H04B 3/487
  USPC .......... 370/201; 375/219, 232, 257, 259, 260, 375/285; 379/93.01
  See application file for complete search history.

(56) References Cited

U.S. PATENT DOCUMENTS

| | | | |
|---|---|---|---|
| 5,892,464 A | 4/1999 | St. John et al. | |
| 6,434,110 B1* | 8/2002 | Hemkumar | 370/201 |
| 7,689,637 B1 | 3/2010 | Gornstein et al. | |
| 8,295,369 B2* | 10/2012 | Fang | 375/257 |
| 2002/0041678 A1* | 4/2002 | Basburg-Ertem et al. | 379/406.01 |
| 2003/0137925 A1 | 7/2003 | Zamir | |
| 2003/0235201 A1 | 12/2003 | Kasper et al. | |
| 2004/0086064 A1 | 5/2004 | Van Acker et al. | |
| 2004/0090927 A1 | 5/2004 | Zimmerman et al. | |
| 2004/0114678 A1 | 6/2004 | Langberg et al. | |
| 2004/0170230 A1 | 9/2004 | Zimmerman et al. | |

(Continued)

FOREIGN PATENT DOCUMENTS

| | | |
|---|---|---|
| CN | 1386323 A | 12/2002 |
| CN | 1395779 A | 2/2003 |

(Continued)

OTHER PUBLICATIONS

U.S. Appl. No. 12/478,962, Sep. 14, 2011.

(Continued)

*Primary Examiner* — Luat Phung
(74) *Attorney, Agent, or Firm* — Leydig, Voit & Mayer, Ltd.

(57) ABSTRACT

A method for canceling crosstalk, the method includes the steps of: filtering the signal corresponding to a far end crosstalk source in the frequency domain according to adaptive filter parameter; combining the received signal corresponding to a far end sending signal and the filtered signal in frequency domain corresponding to the far end crosstalk source. A device for canceling crosstalk and a signal processing system.

9 Claims, 9 Drawing Sheets (56) References Cited

U.S. PATENT DOCUMENTS

| | | | |
|---|---|---|---|
| 2005/0013353 A1 | 1/2005 | Alloin | |
| 2005/0052988 A1 | 3/2005 | Tsatsanis et al. | |
| 2005/0074055 A1 | 4/2005 | Takatori et al. | |
| 2005/0094583 A1* | 5/2005 | Gupta et al. | 370/286 |
| 2005/0099967 A1 | 5/2005 | Baba | |
| 2005/0186933 A1* | 8/2005 | Trans | 455/296 |
| 2006/0029147 A1* | 2/2006 | Tsatsanis | 375/267 |
| 2006/0034162 A1* | 2/2006 | Jones et al. | 370/201 |
| 2006/0078065 A1 | 4/2006 | Cai et al. | |
| 2007/0014378 A1* | 1/2007 | Parhi et al. | 375/267 |
| 2007/0273585 A1 | 11/2007 | Sarroukh et al. | |
| 2008/0188185 A1 | 8/2008 | Shi | |
| 2009/0116639 A1* | 5/2009 | Zimmerman et al. | 379/417 |

FOREIGN PATENT DOCUMENTS

| | | |
|---|---|---|
| CN | 1499734 A | 5/2004 |
| CN | 1552132 | 12/2004 |
| CN | 1689072 | 10/2005 |
| CN | 1689072 A | 10/2005 |
| CN | 1838578 A | 9/2006 |
| CN | 1863099 A | 11/2006 |
| CN | 1866938 A | 11/2006 |
| CN | 1870458 A | 11/2006 |
| CN | 101197593 A | 6/2008 |
| CN | 101197798 B | 11/2011 |
| EP | 2 091 193 A1 | 8/2009 |
| EP | 2 093 896 A1 | 8/2009 |
| WO | WO 03/017534 A2 | 2/2003 |
| WO | WO 2004/017303 A1 | 2/2004 |
| WO | WO 2004/105287 A2 | 12/2004 |
| WO | WO-2005076554 | 8/2005 |
| WO | WO 2005/106841 A1 | 11/2005 |

OTHER PUBLICATIONS

U.S. Appl. No. 12/479,979, Sep. 14, 2011.
2$^{nd}$ Office Action in corresponding Chinese Application No. 200610168031.3 (Mar. 30, 2011).
1$^{st}$ Office Action in corresponding Chinese Application No. 200610164435.5 (Aug. 12, 2010).
2$^{nd}$ Office Action in corresponding Chinese Application No. 200610164435.5 (Feb. 25, 2011).
Extended European Search Report in corresponding European Application No. 07846023.5 (Feb. 15, 2011).
Extended European Search Report from the European Patent Office in corresponding European Patent Application No. 07846070.6 (Apr. 9, 2010).
Written Opinion from the International Searching Authority in corresponding PCT Patent Application No. PCT/CN2007/071204 (Jan. 31, 2008).
International Search Report in corresponding PCT Patent Application No. PCT/CN2007/071204 (Jan. 31, 2008).
Written Opinion from the International Searching Authority in corresponding PCT Patent Application No. PCT/CN2007/071239 (Mar. 27, 2008).
International Search Report in corresponding PCT Patent Application No. PCT Patent Application No. PCT/CN2007/071239 (Mar. 27, 2008).
Written Opinion from the International Searching Authority in corresponding PCT Patent Application No. PCT/CN2007/071175 (Mar. 20, 2008).
International Search Report in corresponding PCT Patent Application No. PCT/CN2007/071175 (Mar. 20, 2008).
U.S. Appl. No. 13/271,903, Oct. 13, 2011.
Written Opinion in PCT Application No. PCT/CN2007/071175, mailed Mar. 20, 2008.
Written Opinion in PCT Application No. PCT/CN2007/071204, mailed Jan. 31, 2008.
Written Opinion in PCT Application No. PCT/CN2007/071239, mailed Mar. 27, 2008.
Communication in European Application No. 07846070.6-2411, mailed Apr. 9, 2010.
Li, Qiang, et al., "Noise Reduction Using a Variable Step Sizze Adaptive Filter," *Optoelectronic Technology & Information*, vol. 17, No. 5, Oct. 2004.
Gilloire, Andre, et al., "Adaptive Filtering in Subbands With Critical Sampling: Analysis, Experiments, and Application to Acoustic Echo Cancellation," *IEEE Transactions on Signal Processing*, vol. 40, No. 8, Aug. 1992.
Information Disclosure Statement in U.S. Appl. No. 12/478,962, filed Jun. 5, 2009.
First Office Action in Chinese Application No. 200610162179.6, mailed Jun. 10, 2010.
First Office Action in Chinese Application No. 200610164436.X, mailed Nov. 27, 2009.
First Office Action in Chinese Application No. 200610168031.3, mailed Jul. 12, 2010.
Information Disclosure Statement in U.S. Appl. No. 12/479,979, filed Jun. 8, 2009.
Langton, Charan, "Inter Symbol Interference (ISI) and raised cosine filtering," Intuitive Guide to Principles of Communications (2002) (available at: http://complextoreal.com/wp-content/uploads/2013/01/isi.pdf).

\* cited by examiner

DEVICE FOR CANCELING CROSSTALK, SIGNAL PROCESSING SYSTEM AND METHOD FOR CANCELING CROSSTALK

CROSS REFERENCE TO RELATED APPLICATIONS

This application is a continuation of PCT patent application No. PCT/CN2007/071239 filed Dec. 14, 2007, which claims priority to Chinese patent application No. 200610168031.3 filed Dec. 15, 2006, content of which is hereby incorporated by reference in their entireties.

FIELD OF THE DISCLOSURE

The present disclosure relates to the field of data communications, and in particular to a method and a device for crosstalk canceling, and a signal processing system.

BACKGROUND OF THE INVENTION

All Digital Subscriber Line (DSL) techniques are collectively referred to as the xDSL, which is a technique for high speed data transmission over a telephone twisted pair. In addition to the base band transmission DSL based upon the Integrated Services Digital Network (ISDN) and the like, the base band transmission xDSL makes use of the frequency division multiplexing technique to make the xDSL and the Plain Old Telephone Service (POTS) coexist on the same twisted pair, where the xDSL occupies the high frequency band and the POTS occupies the base band part below 4 KHz. A system providing multiple accesses for xDSL signals may be referred to as a DSL Access Multiplexer (DSLAM).

As a transmission channel, the telephone twisted pair has a distortion-free information capacity which shall satisfy the Shannon channel capacity formula:

$$C = B \cdot \log_2\left(1 + \frac{S}{N}\right)$$

In the above formula, C denotes a channel capacity, B denotes a channel bandwidth, S denotes signal energy, and N denotes noise energy. It can be seen that an increase of the channel bandwidth and the signal energy can increase the transmission capacity of the channel. However, the channel bandwidth is dependent upon an amplitude-frequency characteristic of the channel, and the signal energy is defined by devices, frequency spectrum compatibility, etc., so that both of them are defined within a certain range. Consequently, the transmission capacity of the channel can not be further increased in the case of the two defined conditions. From another point of view, the transmission capacity of the channel can be increased appropriately if the noise energy is reduced.

The increasing frequency band used for the xDSL technique exacerbates the crosstalk, especially the crosstalk at a high frequency band. Because the xDSL adopts frequency division multiplexing for uplink and downlink channels, a near-end crosstalk may not influence the system performance considerably, but a far-end crosstalk may influence seriously the transmission performance of lines. When an xDSL service is required to be enabled for multiple branches of users over a bundle of cables, some lines may have a low speed, unstable performance and even can not be enabled due to the far-end crosstalk, which may eventually result in a low line activation ratio of the DSLAM.

Figure 1:
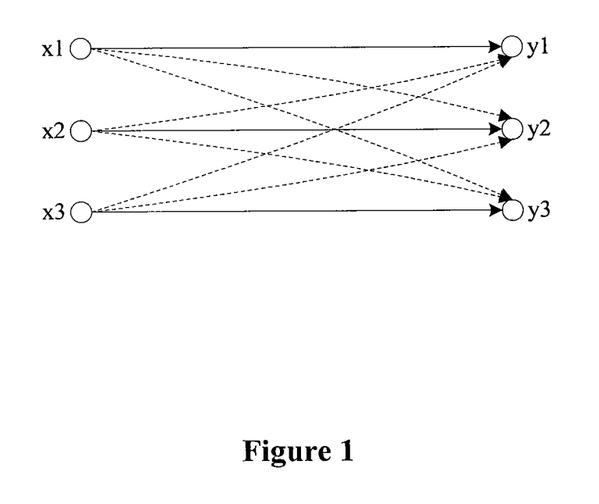
FIG. 1 illustrates a schematic diagram of a far-end crosstalk in the prior art.

FIG. 1 illustrates a schematic diagram of a far-end crosstalk, where x1, x2 and x3 denote signal transmitting points, y1, y2 and y3 denote corresponding far-end signal receiving points, solid line arrows denote normal signal transmission, and dotted line arrows denote a crosstalk caused by a signal transmitting point to the receiving points corresponding to other signal transmitting points. As apparent from FIG. 1, transmitting signals of the points x2 and x3 are crosstalk sources for the transmitting signals of the point x1, and naturally transmitting signals of the point x1 are crosstalk sources for the signals of the points x2 and x3. Therefore, for clarity, a branch of transmitting signals is described as a reference object while regarding other signals as their crosstalk sources hereinafter. Such descriptions can be adaptive to respective branches of signals. Distinguishing names used for signals are merely for convenience, but not intended to differentiate the signals substantively.

Figure 2:
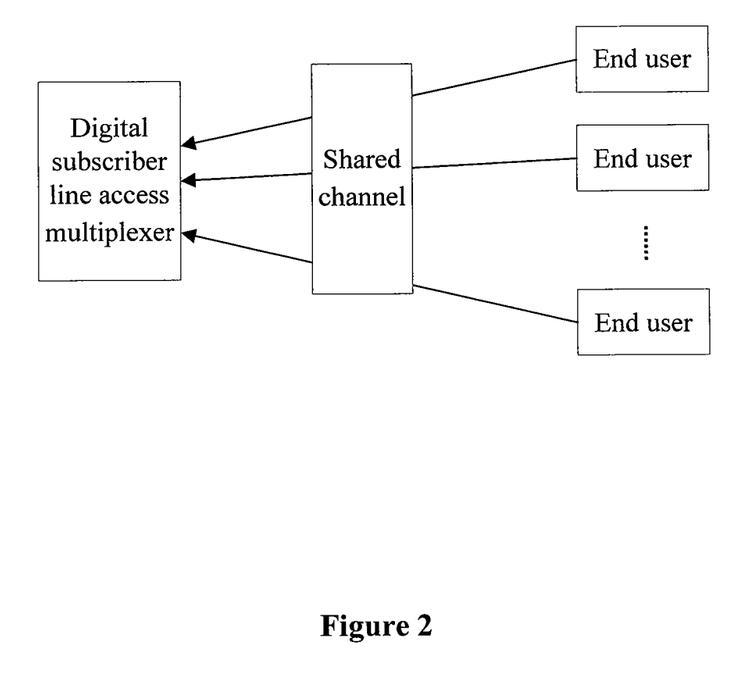
FIG. 2 illustrates a schematic diagram of coordinated reception of multiple branches of xDSL signals at a DSLAM in the prior art.

The vectored-DSL technique has been currently proposed in the industry. The vectored-DSL technique mainly adopts a signal processing method to cancel out a far-end crosstalk among respective branches of signals by use of the coordinated transmission and reception feature at the DSLAM end. FIG. 2 illustrates a schematic diagram of transmission of signals from multiple end users respectively over a shared channel and coordinated reception at the DSLAM end. The far-end crosstalk may be cancelled primarily in a fixed filter manner in the prior art, and a general flow includes the following steps.

S1. Y(f) is transformed by Y(f)=Q*Y(f);

Y(f)=[$Y_1$(f) $Y_2$(f) ... $Y_{L(f)}$]$^T$, where $Y_i$(f), (i=1,2, ... L) denotes a channel output signal corresponding to a signal $X_i$(f), and Y(f)=H(f)X(f)+N(f);

H(f) denotes a channel transmission matrix in the frequency domain, in which a principal diagonal element denotes a line transmission function, and an off-diagonal element at the $k^{th}$ row and the $m^{th}$ column denotes a frequency domain crosstalk coefficient of the $m^{th}$ line to the $k^{th}$ line in a transmission channel;

X(f)=[$X_1$(f) $X_2$(f) ... $X_L$(f)]$^T$, where $X_i$(f), (i=1, 2, ... L) denotes the $i^{th}$ branch of input signals;

N(f) denotes the noise in the channel; and

Q* denotes a conjugate transpose matrix of a unitary matrix resulted from orthogonal triangular decomposition of H(f).

S2. Channel input signals are estimated in a general decision feedback equalization method according to the Y(f) obtained in step S1 and a pre-obtained H(f). Step S1 includes the following steps.

A. An initial value of the variable i is set as L;

B. Noise $N_i$ is cancelled in a predetermined decision rule;

C. The input signal $X_i$ is estimated from the formula:

$$X_i(f) = \left(\hat{Y}_i(f) - \sum_{j=i+1}^{L} R_{i,j} X_j(f)\right) \bigg/ R_{i,i};$$

where R denotes an upper triangular matrix resulting from orthogonal triangular decomposition of H(f).

D. If i>1, i is assigned with the value of i−1, and the flow returns to step S2 until i=1 where the flow ends.

As apparent from the implementation of the method, the channel transmission matrix should be known in advance to cancel out the far-end crosstalk. However, the matrix may be difficult to be obtained accurately and conveniently, and the matrix per se has a feature of slowly time-varying and may be susceptible to a transmission environmental factor. Consequently, the above solution may be difficult to implement in practice.

SUMMARY OF THE DISCLOSURE

Embodiments of the disclosure provide a crosstalk canceling device, a signal processing system and a crosstalk canceling method, to simply address the problem of canceling out a far-end crosstalk among respective lines in a transmission channel.

In order to solve the above technical problem, an embodiment of the disclosure provides a crosstalk canceling method including:

performing frequency domain filtering on a signal corresponding to a far-end crosstalk source according to an adaptive filtering parameter; and synthesizing a received signal corresponding to a far-end transmitting signal and the signal obtained by performing frequency domain filtering on the signal corresponding to the far-end crosstalk source.

Another embodiment of the disclosure provides a crosstalk canceling device including a processing unit, where the processing unit includes:

a first set of filters, adapted to perform frequency domain filtering on signals corresponding to far-end crosstalk sources according to adaptive filtering parameters; and a signal synthesis unit, adapted to synthesize a received signal corresponding to a far-end transmitting signal and the signals filtered by the first set of filters.

A further embodiment of the disclosure provides a signal processing system including a time-frequency conversion unit and a crosstalk canceling device, where the time-frequency conversion unit is adapted to convert signals corresponding to far-end crosstalk sources and a received signal corresponding to a far-end transmitting signal from time domain signals into frequency domain signals respectively and to output the converted signals to the crosstalk canceling device;

the crosstalk canceling device includes a processing unit, which includes a first set of filters and a signal synthesis unit;

the first set of filters are adapted to perform frequency domain filtering on signals obtained by converting the signals corresponding to the far-end crosstalk sources via the time-frequency conversion unit according to adaptive filtering parameters; and the signal synthesis unit is adapted to synthesize a signal obtained by converting the received signal corresponding to the far-end transmitting signal via the time-frequency conversion unit and the signals filtered by the first set of filters.

As apparent from the above technical solutions, the embodiments of the disclosure have the following advantages.

In the embodiments of the disclosure, the signals corresponding to the far-end crosstalk source are frequency domain filtered according to the adaptive filtering parameters, and then are synthesized with the received signals corresponding to the far-end transmitting signals to cancel out a crosstalk. Since the filtering parameters for filtering can be obtained adaptively without prior awareness of any channel transmission matrix, the embodiments of the disclosure can simply cancel out a far-end crosstalk.

DETAILED DESCRIPTION

Figure 3:
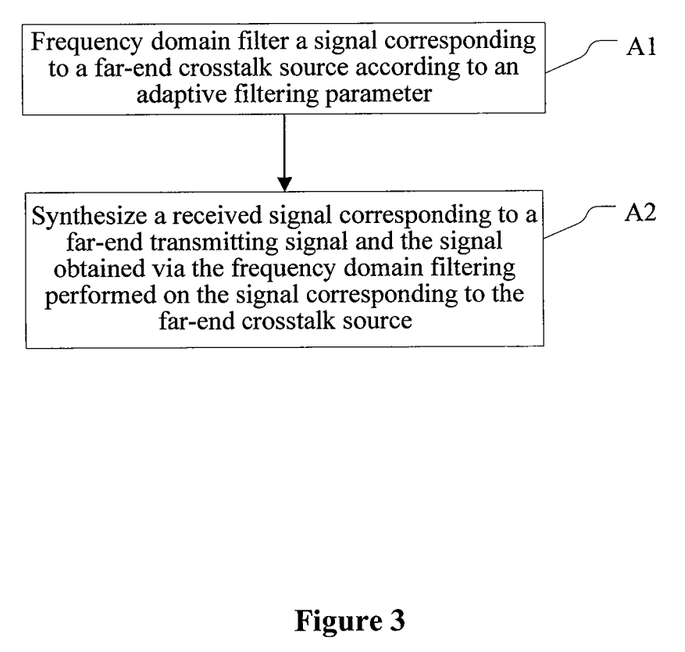
FIG. 3 illustrates a flow chart of a crosstalk canceling method according to an embodiment of the disclosure.

An embodiment of the disclosure provides a crosstalk canceling method to cancel out a crosstalk between coordinated received signals in an adaptive filtering manner in the frequency domain. The method generally includes the following steps as illustrated in FIG. 3.

A1. A signal corresponding to a far-end crosstalk source is frequency domain filtered according to an adaptive filtering parameter. In other words, the signal received from the far-end crosstalk source over a through channel is frequency domain filtered according to the adaptive filtering parameter.

The frequency domain filtering is equivalent to multiplication of a component of a signal over a corresponding sub-carrier by a complex coefficient. The complex coefficient has a modulus indicating a gain over the frequency band, and a phase angle indicating a leading or lag phase response over the frequency band. The signal corresponding to the far-end crosstalk source refers to a signal received from pairs of lines resulting in a far-end crosstalk.

A2. A received signal corresponding to a far-end transmitting signal and the signal obtained via the frequency domain filtering performed on the signal corresponding to the far-end crosstalk source are synthesized.

Embodiments of the above method are detailed below.

Figure 4:
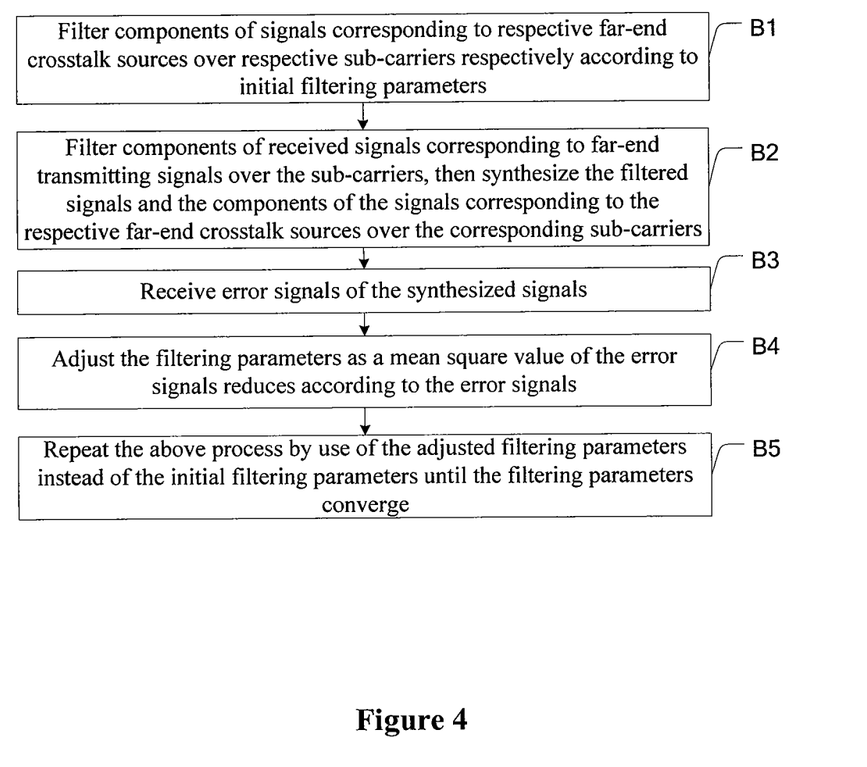
FIG. 4 illustrates a flow chart of a crosstalk canceling method according to a first embodiment of the disclosure.

The first embodiment provides a crosstalk canceling method, a flow chart of which is illustrated in FIG. 4. The method includes the following steps.

B1. Components of signals corresponding to respective far-end crosstalk sources over respective sub-carriers are filtered respectively according to initial filtering parameters.

The initial filtering parameters may be empirical values or may be generated randomly.

B2. Components of received signals corresponding to far-end transmitting signals over the sub-carriers are filtered, and then synthesized with the components of the signals corresponding to the respective far-end crosstalk sources over the corresponding sub-carriers.

B3. Error signals of the synthesized signals are received.

The error signals may be signals resulting from delay and decision of the synthesized signals.

B4. The filtering parameters are adjusted as a mean square value of the error signals reduces according to the error signals.

B5. The above process is repeated by use of the adjusted filtering parameters instead of the initial filtering parameters until the filtering parameters converge.

Figure 5:
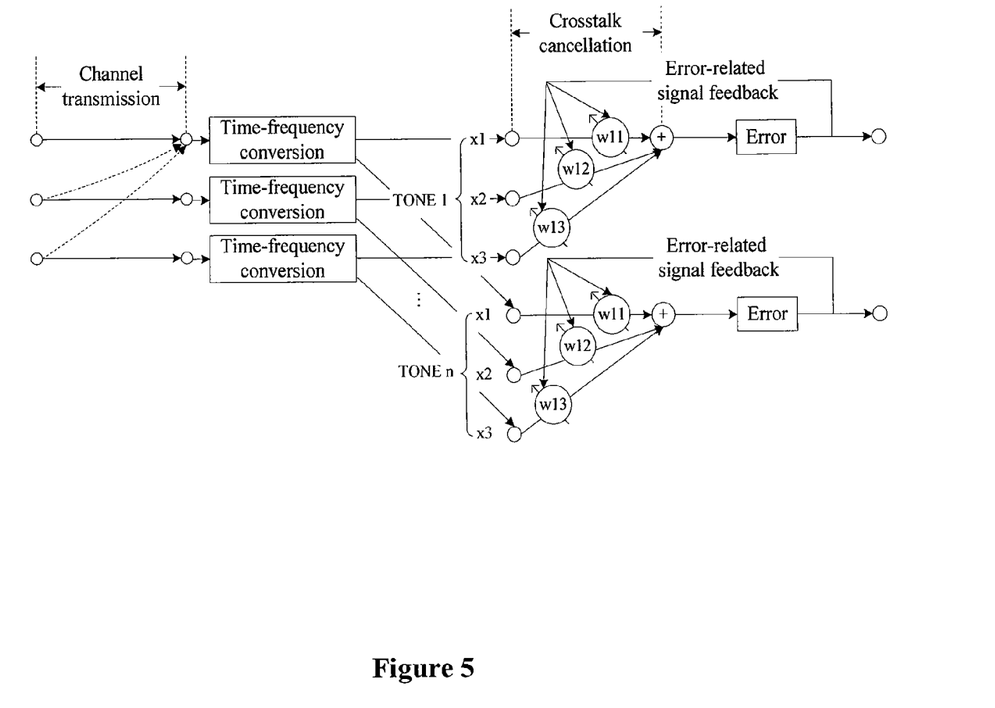
FIG. 5 illustrates a schematic diagram of signal processing in a crosstalk canceling method according to the first embodiment of the disclosure.

FIG. 5 illustrates a schematic diagram of a specific signal processing in an example, in which a branch of signals x1 are transmitting signals and branches of signals x2 and x3 are crosstalk to the branch of signals x1. FIG. 5 illustrates a filtering process of a number n of sub-carriers Tone 1 to Tone n, in which only the branches of signals x2 and x3 input into frequency domain filters w12 and w13 are depicted to reflect filtering of crosstalk sources (this also applies to the embodiments below). Apparently, this signal processing model may be extended to respective branches of signals. For example, in this embodiment, filters with filtering parameters w21 and w23 (not shown) may be further added for filtering with the branches of signals x1 and x3 as crosstalk sources to the branch of signals x2. In this circumstance, feedbacks required for the filtering parameters w21 and w23 are error-related signal feedbacks from the opposite ends.

The filtering parameters to be adjusted in this embodiment are the filtering parameters w11, w12 and w13 of the frequency domain filters over the sub-carriers. If fed-back error signals include components corresponding to the sub-carriers, only the components of the fed-back error signals of the corresponding sub-carriers may be considered in the filtering parameters adjustment.

The filtering parameters may be adjusted in a selected appropriate adaptive algorithm as needed, such as the Least Mean Square (LMS) error algorithm, or the Recursive Least Square (RLS) algorithm. In the case of the LMS algorithm, the filtering parameters may be adjusted with the formula $w(n+1)=w(n)+2\lambda e(n)\overline{u}(n)$, where $w(n+1)$ and $w(n)$ respectively denote a filtering parameter after and before the $(n+1)^{th}$ iteration, $u(n)$ denotes an input signal while being filtered by $w(n)$, $2\lambda$ denotes a selected step, $e(n)$ denotes an error signal, w, e and u denotes variables in the frequency domain, and $\overline{u}(n)$ denotes the conjugation of $u(n)$.

The embodiment is advantageous in that the output synthesized signals are equalized resultant signals because w11 provides the frequency domain equalization function.

In the above embodiment, the error signals may be the synthesized signals per se or signals resulting from other processing than the delay and decision of the signals. Transmission of transmitting signals shall be stopped during adaptive adjustment of the filtering parameters to ensure the validity. In this case, the synthesized signals or the signals resulting from the other processing represent an estimated error $e(n)$. This method may be advantageous in terms of an adaptive convergence speed, a degree of approximation to an optimal point, etc.

Figure 6:
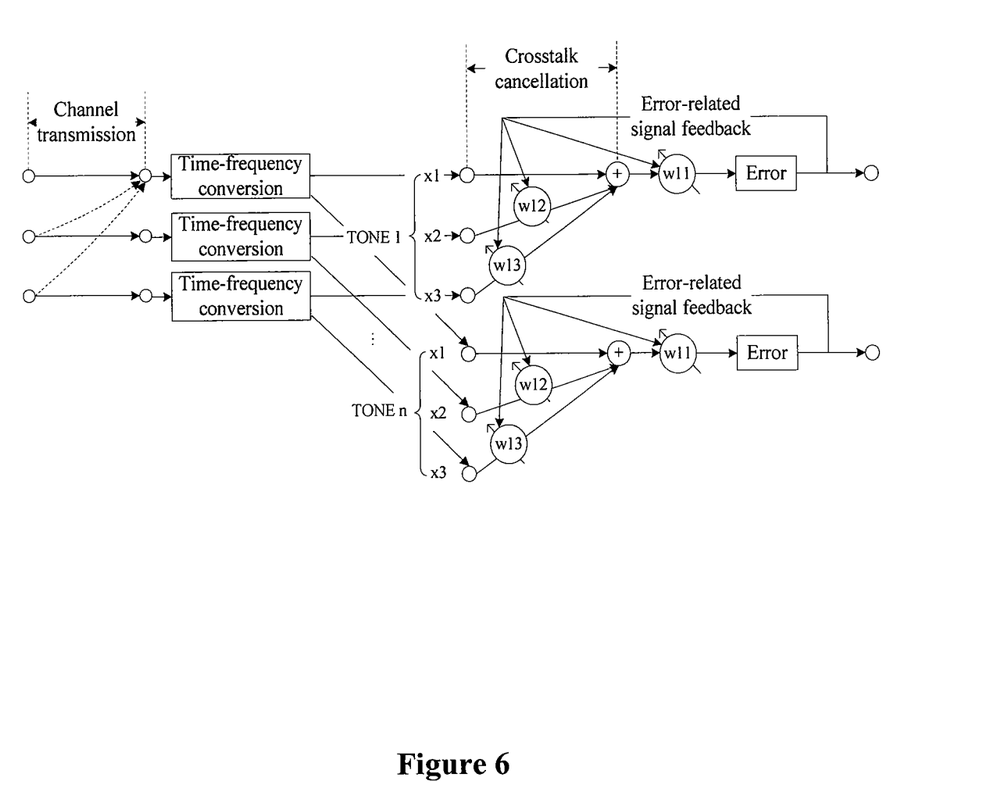
FIG. 6 illustrates a schematic diagram of signal processing in a crosstalk canceling method according to a second embodiment of the disclosure.

The second embodiment provides a far-end crosstalk canceling method with a signal processing illustrated in FIG. 6. This embodiment is similar to the first embodiment except that in this embodiment components of the received signals corresponding to the far-end transmitting signals over the respective sub-carriers are respectively synthesized with components of the frequency domain filtered crosstalk source signals over the corresponding sub-carriers, and the synthesized signals are then frequency domain filtered, instead of being frequency domain filtered before synthesis of the components. Alike, the filtering parameters for the performing of frequency domain filtering the received signals may be adjusted according to error signals. The above descriptions may be made reference to for details of a specific implementation of this method and repeated descriptions are omitted here.

The above second embodiment is advantageous in that if a new user line is added, for example, if a user line x3 is added while assuming previous presence of only user lines x1 and x2, only w13 and w11 may be updated without the need of updating any other filter. If a user quits, for example, if the user line x3 is removed, w13 needs to be disabled and only w11 may be updated. This method can facilitate activation or inactivation of a user and reduce as much as possible the influence upon another user in the case of a large number of users.

In the above embodiment, the error signals of the synthesized signals should be fed back in order to adjust the filtering parameters, and accordingly a large amount of data may be transmitted. In a further embodiment of the invention, the amount of data to be transmitted may be reduced in a way of feeding back signs of the error signals.

Figure 7:
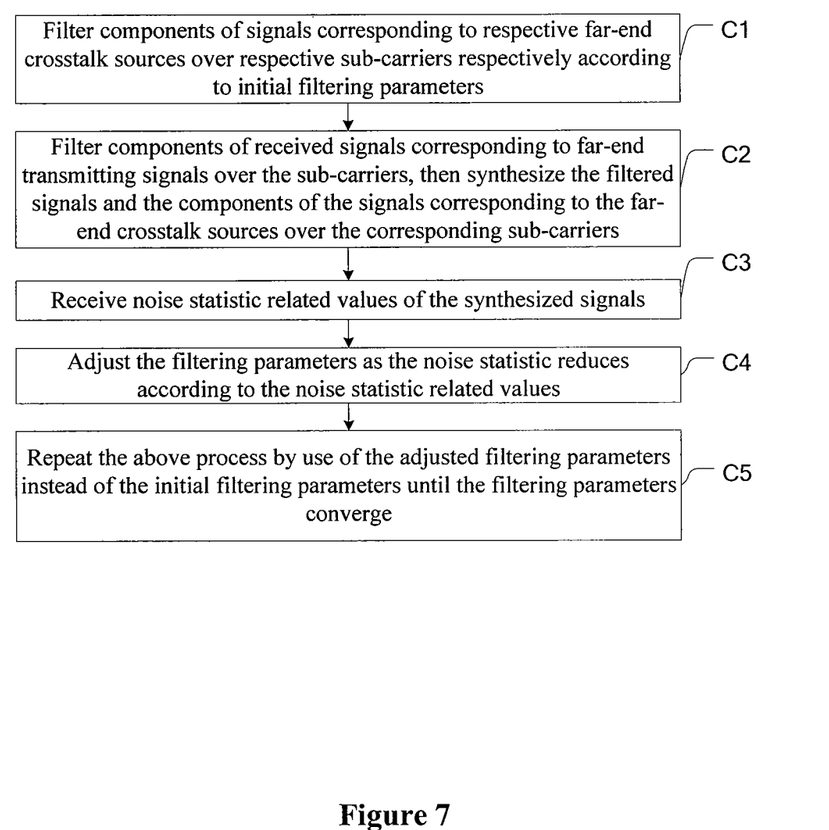
FIG. 7 illustrates a flow chart of a crosstalk canceling method according to a third embodiment of the disclosure.

The third embodiment provides a crosstalk canceling method, a flowchart of which is as illustrated in FIG. 7. The method includes the following steps.

C1. Components of signals corresponding to respective far-end crosstalk sources over respective sub-carriers are filtered respectively according to initial filtering parameters.

The initial filtering parameters may be empirical values or may be generated randomly.

C2. Components of received signals corresponding to far-end transmitting signals over the sub-carriers are filtered, and then synthesized with the components of the signals corresponding to the far-end crosstalk sources over the corresponding sub-carriers.

C3. Noise statistic related values of the synthesized signals are received.

Each of the noise statistic related values of the synthesized signals may include a noise statistic value, a difference between two adjacent noise statistics, a sign of the difference between two adjacent noise statistics, etc.

C4. As the noise statistic reduces, the filtering parameters are adjusted according to the noise statistic related values.

C5. The above process is repeated by use of the adjusted filtering parameters as the current filtering parameters until the filtering parameters converge.

The filtering parameters may be adjusted in a selected appropriate method as needed, such as the gradient estimation decision iterative method or the optimal value search method. A preferred embodiment with the gradient estimation decision iterative method given below includes the following steps.

D1. A current filtering parameter is iterated respectively with several gradient vectors. The following formula may be used for iteration to improve the accuracy of gradient vector estimation:

$$w(n+1)=w(n)+\lambda\times\text{sign}[e(n)]\times u(n)$$

In the formula, w, e and u denote parameters in the frequency domain, $w(n+1)$ and $w(n)$ respectively denote filtering parameters after and before the $(n+1)^{th}$ iteration, $\lambda$ denotes a selected step, $\text{sign}[e(n)]$ denotes a sign of an estimated noise error, and $u(n)$ denotes an input signal while being filtered by $w(n)$. The $\text{sign}[e(n)]\times u(n)$ denotes a gradient vector, which depends on $\text{sign}[e(n)]$. The $u(n)$ may be in different forms of data depending on different types of adaptive filters. For example, $u(n)$ denotes a matrix of L rows and M columns if a block Least Mean Square (LMS) filter with an order M and a length L is used, or denotes an M-dimension vector if a general LMS filter with an order M is used.

It shall be noted that the above iterative formula provides a large number of candidate iterative values as filtering parameters that can be attempted. For example, if the input $u(n)$ is a data block with a length L, $2^L$ candidate iterative values may be generated because of two signs "+" and "−" of sign[e(n)]. It is possible in practical application to select part of all possible values as the candidate iterative values to improve a search speed.

D2. A gradient vector minimizing the noise statistic is decided according to the noise statistic related values corresponding to the respective sets of iterated filtering parameters.

Ideally, the gradient vector decided according to the fedback noise statistic related value is generally correct, but a decision error may arise due to an additional influence of statistic non-stationary which may possibly occur with the noise in practice. However, a correct decision ratio over 50% is sufficient to eventually obtain a convergence result regardless of a possible devious route passing at a "Hyper-bowl" surface. The correct decision ratio may be improved by increasing the step appropriately in an adaptive filter principle.

D3. The filtering parameters iterated with the decided gradient vector are used as adjusted filtering parameters.

The fourth embodiment provides a far-end crosstalk canceling method with a flow similar to that of the third embodiment, except that in this embodiment components of the received signals corresponding to the far-end transmitting signals over the respective sub-carriers are respectively synthesized with components of the frequency domain filtered crosstalk source signals over the corresponding sub-carriers and the synthesized signals are then frequency domain filtered, instead of being frequency domain filtered before synthesis of the components. Alike, the filtering parameters for frequency domain filtering the received signals may be adjusted according to the noise statistic related values.

A crosstalk canceling device and a signal processing system according to embodiments of the disclosure are detailed below.

The crosstalk canceling device according to an embodiment of the disclosure mainly includes a processing unit. The processing unit includes a first set of filters and a signal synthesis unit. The first set of filters, including several adaptive frequency domain filters, is adapted to perform frequency domain filtering on signals corresponding to far-end crosstalk sources or components of the signals corresponding to the far-end crosstalk sources over respective sub-carriers respectively according to adaptive filtering parameters. The signal synthesis unit is adapted to synthesize frequency domain received signals corresponding to far-end transmitting signals and the signals filtered by the first set of filters.

A preferred embodiment of the device is detailed below.

Figure 8:
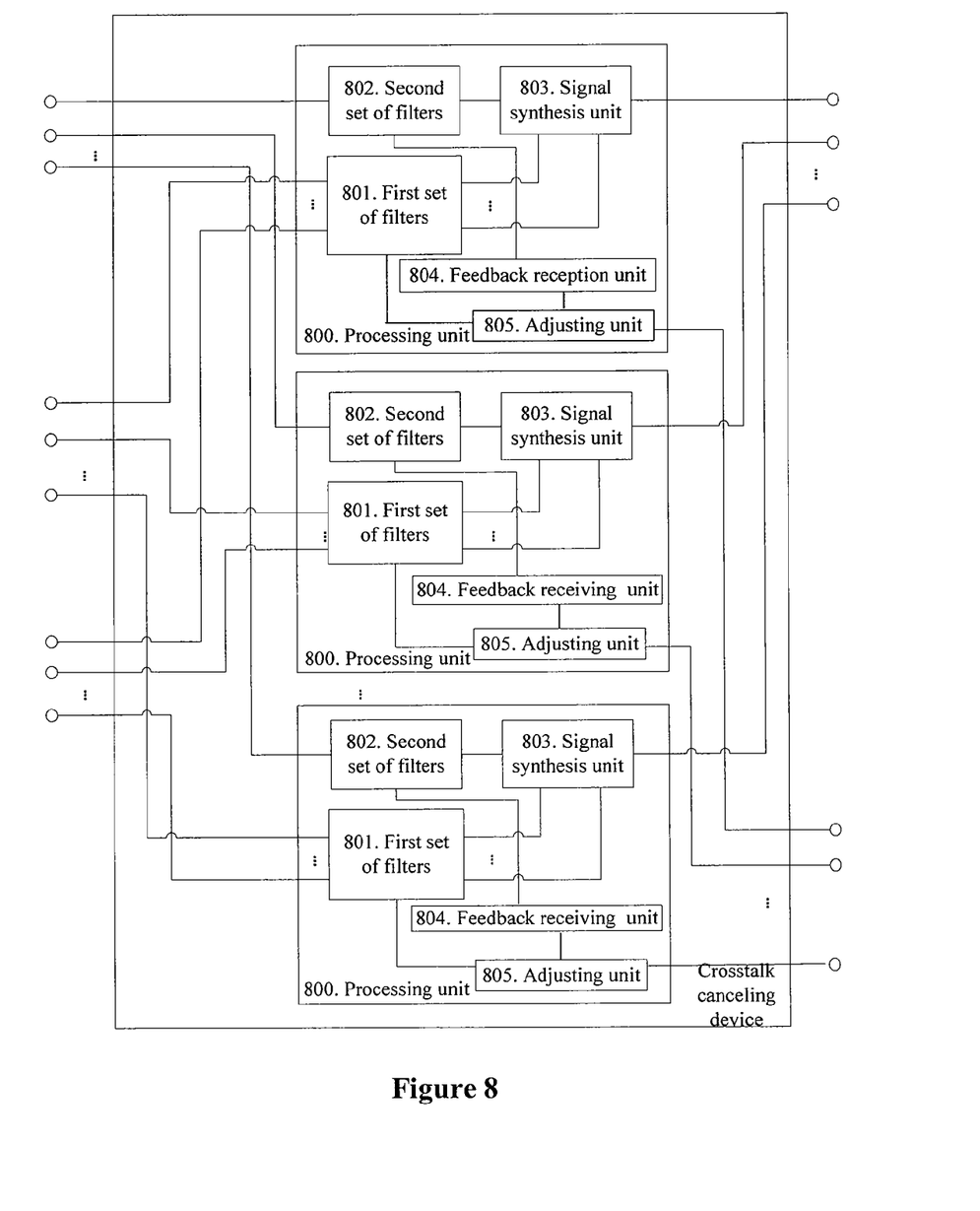
FIG. 8 illustrates a structural diagram of a crosstalk canceling device according to a fifth embodiment of the disclosure.

The fifth embodiment provides a crosstalk canceling device, a schematic structural diagram of which is illustrated in FIG. 8. The crosstalk canceling device includes a processing unit 800. The processing unit 800 includes: a first set of filters 801, a second set of filters 802, a signal synthesis unit 803, a feedback receiving unit 804, and an adjusting unit 805.

The first set of filters 801 is adapted to perform frequency domain filtering on components of signals corresponding to far-end crosstalk sources over respective sub-carriers respectively according to adaptive filtering parameters, and to adjust, according to error-related signals received by the feedback receiving unit 804, the filtering parameters as a mean square value of the error reduces.

The second set of filters 802, coupled to an input of the signal synthesis unit, is adapted to perform frequency domain filtering on components of received signals corresponding to far-end transmitting signals over the respective sub-carriers respectively according to adaptive filtering parameters, and to adjust, according to the error-related signals received by the feedback receiving unit 804, the filtering parameters as a mean square value of the error reduces.

The signal synthesis unit 803 is adapted to synthesize the components of the signals filtered by the second set of filters 802 over the sub-carriers and the components of the signals filtered by the first set of filters 801 over the corresponding sub-carriers.

The feedback receiving unit 804 is adapted to receive the signals synthesized by the signal synthesis unit 803 or the error-related signals of signals corresponding to the synthesized signals, for example, adapted to receive the signals filtered by the second set of filters or the error-related signals of signals corresponding to the filtered signals.

The adjusting unit 805 is adapted to adjust the filtering parameters according to the information and to send the adjusted filtering parameters to the first set of filters 801.

The functions and operations of the respective units in the crosstalk canceling device of the embodiment may be implemented as in the corresponding steps of the crosstalk canceling method of the first embodiment, the descriptions of which are omitted here.

In a further embodiment of the invention, the crosstalk canceling device may further include a time-frequency conversion unit adapted to convert the far-end crosstalk source signals and signals corresponding to the far-end transmitting signals into frequency domain signals, and to output them respectively to the first and second sets of filters.

Figure 9:
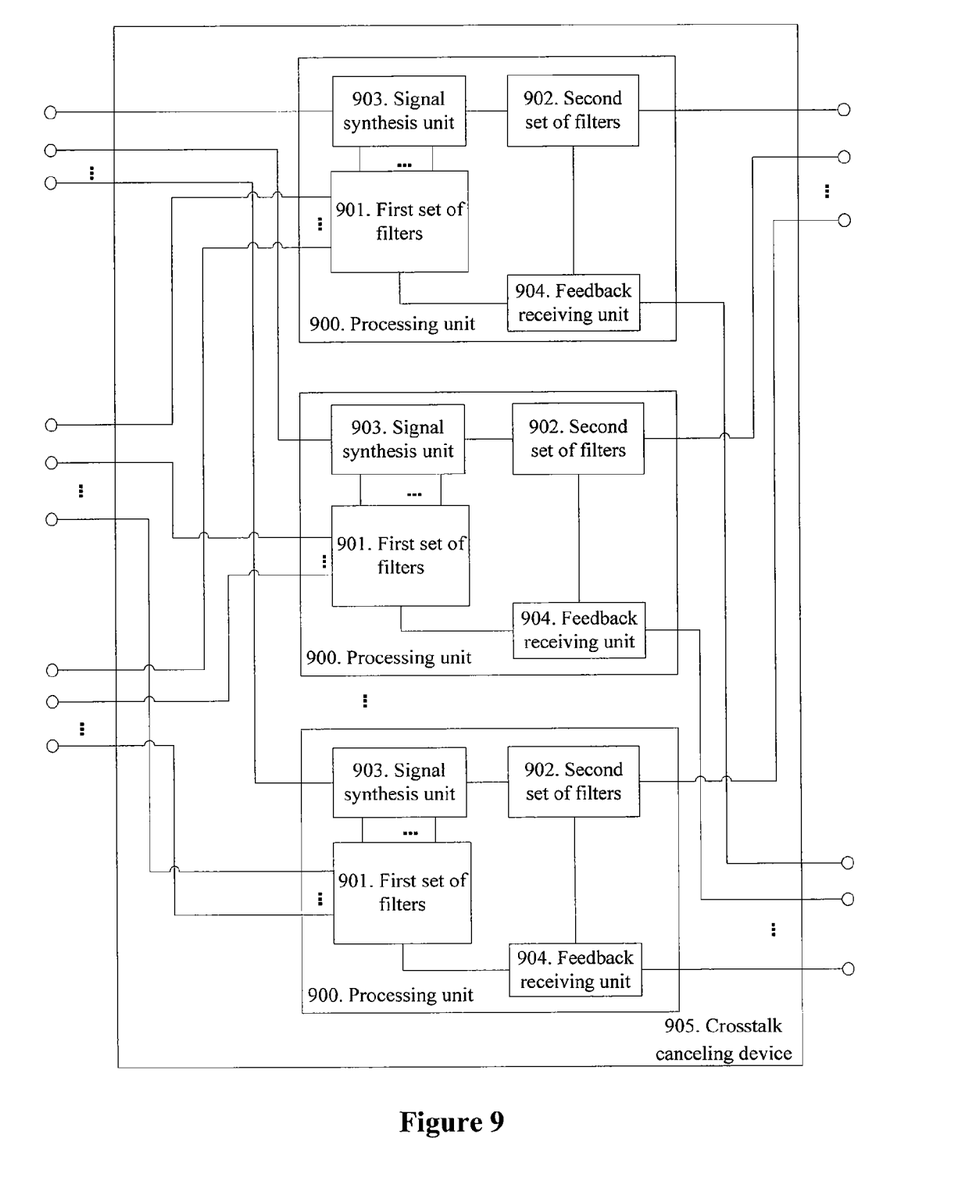
FIG. 9 illustrates a structural diagram of a crosstalk canceling device according to a sixth embodiment of the disclosure.

The sixth embodiment provides a crosstalk canceling device as illustrated in FIG. 9. The crosstalk canceling device includes a processing unit 900. The processing unit 900 includes: a first set of filters 901, a second set of filters 902, a signal synthesis unit 903, and a feedback receiving unit 904.

The first set of filters 901 is adapted to perform frequency domain filtering on components of signals corresponding to far-end crosstalk sources over respective sub-carriers respectively according to adaptive filtering parameters, and to adjust, according to error-related signals received by the feedback receiving unit 904, the filtering parameters as a mean square value of the error reduces.

The signal synthesis unit 903 is adapted to synthesize components of received signals corresponding to far-end transmitting signals over the respective sub-carriers and the components of the signals filtered by the first set of filters 901 over the corresponding sub-carriers.

The second set of filters 902 is coupled to an output of the signal synthesis unit 903, and is adapted to perform frequency domain filtering on the components of the signals synthesized by the signal synthesis unit 903 over the respective sub-carriers respectively according to adaptive filtering parameters, and to adjust, according to the error-related signals received by the feedback receiving unit 904, the filtering parameters as a mean square value of the error reduces.

The feedback receiving unit 904 is adapted to receive the signals filtered by the second set of filters 902 or the error-related signals of signals corresponding to the filtered signals.

The functions and operations of the respective units in the crosstalk canceling device in the embodiment may be implemented as in the corresponding steps of the crosstalk canceling method in the second embodiment, the descriptions of which are omitted here.

In a further embodiment of the invention, the crosstalk canceling device may further include a time-frequency conversion unit adapted to convert the far-end crosstalk source signals and signals corresponding to the far-end transmitting signals into frequency domain signals, and to output them respectively to the first set of filters and the signal synthesis unit.

The seventh embodiment provides a crosstalk canceling device with a structure similar to that in the fifth embodiment. The crosstalk canceling device includes: a processing unit. The processing unit includes: a first set of filters, a second set of filters, a signal synthesis unit, and a feedback receiving unit.

The first set of filters is adapted to perform frequency domain filtering on components of signals corresponding to far-end crosstalk sources over respective sub-carriers respectively according to adaptive filtering parameters, and to adjust, according to a noise statistic related value received by the feedback receiving unit, the filtering parameters as the noise statistic reduces.

The second set of filters is coupled to an input of the synthesis unit, and is adapted to perform frequency domain filtering on components of received signals corresponding to far-end transmitting signals over the respective sub-carriers respectively according to adaptive filtering parameters, and to adjust, according to the noise statistic related value received by the feedback receiving unit, the filtering parameters as the noise statistic reduces.

The signal synthesis unit is adapted to synthesize the components of the signals filtered by the second set of filters over the respective sub-carriers and the components of the signals filtered by the first set of filters over the corresponding sub-carriers.

The feedback receiving unit is adapted to receive the signals synthesized by the signal synthesis unit or the noise statistic related value of signals corresponding to the synthesized signals.

The functions and operations of the respective units in the crosstalk canceling device in the embodiment may be implemented as in the corresponding steps of the crosstalk canceling method in the third embodiment, the descriptions of which are omitted here.

In a further embodiment of the invention, the crosstalk canceling device may further include a time-frequency conversion unit adapted to convert the far-end crosstalk source signals and signals corresponding to the far-end transmitting signals into frequency domain signals, and to output them respectively to the first and second sets of filters.

The eighth embodiment provides a crosstalk canceling device with a structure similar to that in the sixth embodiment. The crosstalk canceling device includes a processing unit. The processing unit includes: a first set of filters, a second set of filters, a signal synthesis unit, and a feedback receiving unit.

The first set of filters is adapted to perform frequency domain filtering on components of signals corresponding to far-end crosstalk sources over respective sub-carriers respectively according to adaptive filtering parameters, and to adjust, according to a noise statistic related value received by the feedback receiving unit, the filtering parameters as a mean square value of the noise statistic reduces.

The signal synthesis unit is adapted to synthesize components of received signals corresponding to far-end transmitting signals over the respective sub-carriers and the components of the signals filtered by the first set of filters over the corresponding sub-carriers.

The second set of filters is coupled to an output of the signal synthesis unit, and is adapted to perform frequency domain filtering on the components of the signals synthesized by the signal synthesis unit over the respective sub-carriers respectively according to adaptive filtering parameters, and to adjust, according to the noise statistic related value received by the feedback receiving unit, the filtering parameters as a mean square value of the noise statistic reduces.

The feedback receiving unit is adapted to receive the signals filtered by the second set of filters or the noise statistic related value of signals corresponding to the filtered signals.

The functions and operations of the respective units in the crosstalk canceling device in the embodiment may be implemented as in the corresponding steps of the crosstalk canceling method in the fourth embodiment, the descriptions of which are omitted here.

In a further embodiment of the invention, the crosstalk canceling device may further include a time-frequency conversion unit adapted to convert the far-end crosstalk source signals and signals corresponding to the far-end transmitting signals into frequency domain signals, and to output them respectively to the first set of filters and the signal synthesis unit.

A signal processing system according to an embodiment of the disclosure is detailed below.

The signal processing system according to an embodiment of the disclosure includes a time-frequency conversion unit and a crosstalk canceling device.

The time-frequency conversion unit is adapted to convert far-end crosstalk source signals and signals corresponding to far-end transmitting signals into frequency domain signals, and to output them to the crosstalk canceling device.

The crosstalk canceling device mainly includes a processing unit. The processing unit includes: a first set of filters, a signal synthesis unit, and a feedback receiving unit.

The first set of filters includes a plurality of adaptive frequency domain filters and is adapted to perform frequency domain filtering on components of signals corresponding to far-end crosstalk sources over respective sub-carriers and to adjust filtering parameters according to related information received by the feedback receiving unit.

The signal synthesis unit is adapted to synthesize received signals corresponding to far-end transmitting signals and the components of the signals filtered by the first set of filters.

The feedback receiving unit is adapted to receive the signals synthesized by the signal synthesis unit, which are fed back by the signal synthesis unit or another signal processing device, or related information of signals corresponding to the synthesized signals.

In a preferred embodiment of the system, the crosstalk canceling device may have at least the structures in the fifth, sixth, seventh or eighth embodiments, the functions and operations of the respective units in the device may be implemented as in the corresponding steps of the crosstalk canceling method in the first, second, third and fourth embodiments, the descriptions of which are omitted here.

The crosstalk canceling device, the signal processing system and the crosstalk canceling method according to the embodiments of the disclosure have been described in detail as above, the principle and embodiments of the invention have been set forth by way of specific examples, and the above descriptions of the embodiments are intended merely to facilitate understanding of the invention and the essential idea thereof. Those ordinarily skilled in the art can modify the embodiments and their application scopes without departing from the teaching of embodiments of the invention. Accordingly, the disclosure in the specification shall not be taken in any way to limit the scope of the invention.

The invention claimed is:

1. A crosstalk canceling method, comprising:
   performing, at a first receiving end connected to a first transmitting end over a first line, frequency domain filtering on a plurality of signals corresponding to a plurality of far-end crosstalk sources according to a plurality of adaptive filtering parameters, wherein each signal corresponds to a different far-end crosstalk source and is related to a signal to be transmitted over a different line;
synthesizing, at the first receiving end, a received signal corresponding to a far-end transmitting signal with the plurality of signals obtained by performing frequency domain filtering on the signals corresponding to the far-end crosstalk sources;
receiving, at the first receiving end, information of the synthesized signals fed back from the far-end crosstalk sources, wherein the information comprises an error-related signal or a noise statistic related value; and
adjusting, at the first receiving end, the plurality of adaptive filtering parameters corresponding to each different line used in the frequency domain filtering according to the information.

2. The crosstalk canceling method according to claim 1, wherein:
the process of performing, at the first receiving end connected to the first transmitting end over the first line, frequency domain filtering comprises: performing, at the first receiving end, frequency domain filtering on sub-carrier components of signals corresponding to the plurality of far-end crosstalk sources; and
the process of synthesizing, at the first receiving end, the received signal corresponding to the far-end transmitting signal with the signals obtained by performing frequency domain filtering on the signals corresponding to the far-end crosstalk sources comprises: synthesizing, at the first receiving end, sub-carrier components of the received signal corresponding to the far-end transmitting signal and signals obtained by performing frequency domain filtering on the sub-carrier components of the signals corresponding to the plurality of far-end crosstalk sources.

3. The crosstalk canceling method according to claim 1, further comprising performing frequency domain filtering on a synthesized signal according to an adaptive filtering parameter.

4. The crosstalk canceling method according to claim 3, further comprising: performing frequency domain filtering on the received signal corresponding to the far-end transmitting signal according to an adaptive filtering parameter.

5. The crosstalk canceling method according to claim 1, wherein:
the received signal corresponding to the far-end transmitting signal and the signals corresponding to the far-end crosstalk sources are frequency domain signals via time-frequency conversion, respectively.

6. A crosstalk canceling device, which is implemented in a first receiving end connected to a first transmitting end over a first line, comprising a processing unit, wherein the processing unit comprises:
a plurality of adaptive filters, wherein each of the plurality of adaptive filters is adapted to perform frequency domain filtering on a signal corresponding to a far-end crosstalk source according to an adaptive filtering parameter, wherein each signal corresponding to the far-end crosstalk source is related to a corresponding signal to be transmitted over a corresponding line;
a signal synthesis unit, adapted to synthesize a received signal corresponding to a far-end transmitting signal and the signals filtered by the plurality of adaptive filters;
a feedback reception unit, adapted to receive information of the synthesized signals fed back from the far-end crosstalk sources, wherein the information comprises an error-related signal or a noise statistic related value; and
an adjusting unit, adapted to adjust the filtering parameter of each line according to the information and to send the adjusted filtering parameters to the plurality of adaptive filters and/or a second set of filters.

7. The crosstalk canceling device according to claim 6, wherein
the second set of filters is coupled to an input of the synthesis unit, and is adapted to perform frequency domain filtering on the received signal corresponding to the far-end transmitting signal according to an adaptive filtering parameter and to transmit a filtering result to the signal synthesis unit; or
the second set of filters is coupled to an output of the signal synthesis unit and is adapted to perform frequency domain filtering on the synthesized signals according to adaptive filtering parameters.

8. A signal processing system, comprising a time-frequency conversion unit and a crosstalk canceling device, wherein:
the time-frequency conversion unit is adapted to convert signals corresponding to far-end crosstalk sources and a received signal corresponding to a far-end transmitting signal from time domain signals into frequency domain signals and to output the converted signals to the crosstalk canceling device;
the crosstalk canceling device comprises a processing unit, which comprises a plurality of adaptive filters, a signal synthesis unit, a feedback reception unit, and an adjusting unit;
each of the plurality of adaptive filters is adapted to perform frequency domain filtering on a signal obtained by converting a signal corresponding to a far-end crosstalk source via the time-frequency conversion unit according to adaptive filtering parameters, wherein each signal corresponding to a far-end crosstalk source is related to a signal to be transmitted over a corresponding line;
the signal synthesis unit is adapted to synthesize a signal obtained by converting the received signal corresponding to the far-end transmitting signal via the time-frequency conversion unit and the signals filtered by the plurality of adaptive filters;
a feedback reception unit, adapted to receive information of the synthesized signals fed back from the far-end crosstalk sources, wherein the information comprises an error-related signal or a noise statistic related value; and
an adjusting unit, adapted to adjust the filtering parameter of each corresponding line according to the information and to send the adjusted filtering parameters to the plurality of adaptive filters and/or a second set of filters.

9. The signal processing system according to claim 8, wherein
the second set of filters is coupled to an input of the synthesis unit, and is adapted to perform frequency domain filtering on a signal obtained by converting the received signal corresponding to the far-end transmitting signal converted via the time-frequency conversion unit according to an adaptive filtering parameter and to transmit a filtering result to the signal synthesis unit; or
the second set of filters is coupled to an output of the synthesis unit, and is adapted to perform frequency domain filtering on the synthesized signals according to adaptive filtering parameters.

* * * * *